F. C. SCOTT.
HOSE CLAMP.
APPLICATION FILED MAR. 26, 1915.

1,186,138.

Patented June 6, 1916.

WITNESSES
Jas. K. McCathran
H. T. Chapman.

Frederick C. Scott, INVENTOR
BY E. G. Siggers
ATTORNEY

UNITED STATES PATENT OFFICE.

FREDERICK CHARLES SCOTT, OF HORNBY ISLAND, BRITISH COLUMBIA, CANADA.

HOSE-CLAMP.

1,186,138.   Specification of Letters Patent.   Patented June 6, 1916.

Application filed March 26, 1915. Serial No. 17,212.

*To all whom it may concern:*

Be it known that I, FREDERICK C. SCOTT, a subject of the King of Great Britain residing at Hornby Island, British Columbia, Dominion of Canada, have invented a new and useful Hose-Clamp, of which the following is a specification.

This invention relates to hose clamps, and its object is to provide a hose clamp of particularly strong and efficient construction which may be applied to the hose after the hose connections are assembled, and which will neither buckle nor dig into the walls of the hose.

In accordance with the present invention the hose clamp is composed of two members with a draw-up bolt, one member defining more than three hundred and sixty degrees when applied to the hose, and the other having an extent of less than three hundred and sixty degrees, or even less than one hundred and eighty degrees. The two members are attached by means of hooks struck up from one member entering eyes produced in the other member, the arrangement being such that the clamp has two positions of adjustment, which together with the extent of take up of the bolt provides for the application of the clamp to a wide range of different sizes of hose. By the peculiar construction employed in accordance with the present invention, the clamp will stand heavy strains even though the material from which the clamp is made be of light gage.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications mark no material departure from the salient features of the invention.

Figure 1:
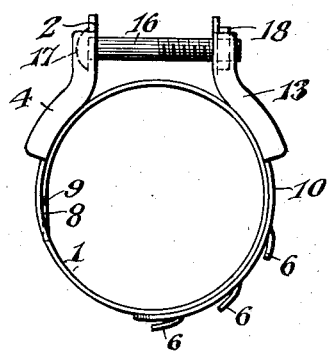
Figure 2:
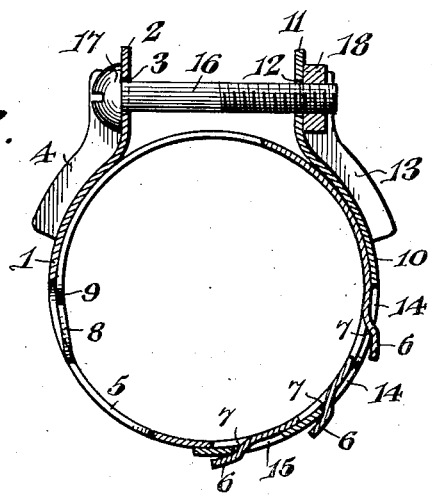
Figure 3:
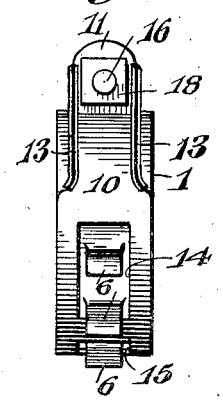
Figure 4:
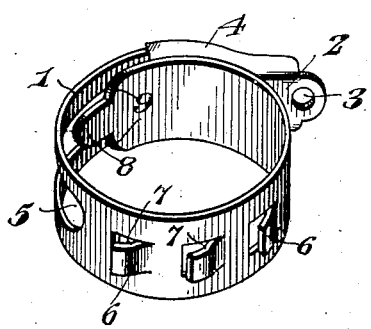
Figure 5:
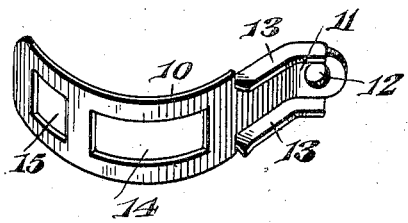

In the drawings:—Figure 1 is an edge view of the assembled clamp. Fig. 2 is a section taken on a plane parallel with one edge or end of the clamp with some of the parts which would otherwise be cut by the sectional plane shown in elevation. Fig. 3 is a side elevation of the clamp. Fig. 4 is a perspective view of the longer member of the clamp. Fig. 5 is a perspective view of the shorter member of the clamp.

Referring to the drawings, there is shown a clamp member 1 composed of an elongated strip of flat metal coiled into a volute of a little more than one turn. One end of the strip 1 is bent at an angle, as shown at 2, and provided with a perforation 3 and at the sides of the end 2 and adjacent portions of the strip 1 the metal is outturned to form webs 4 serving to greatly stiffen the perforated end 2 where connecting to the body of the strip 1, so that considerable force may be applied to the end 2 without liability of bending it.

Adjacent to the end 2 with the webs 4 the clamp member 1 is formed with an elongated longitudinally disposed slot 5 and at points still farther away from the end 2 the metal of the strip is struck up to form hooks 6. These hooks are produced by cutting through the metal around three sides of a rectangle, with the fourth side left integral with the strip or band 1. Each hook 6 is bent away from the body of the strip 1 where joining it, and at a point intermediate of the length of the hook the latter is then bent toward the strip 1 to form a shoulder 7. In the showing of the drawings there are three hooks 6 equi-distantly spaced and located at about mid length of the strip or band 1. That end of the strip 1 remote from the end 2 is narrowed into a tongue 8 extending lengthwise of the strip, while the end of the strip from which the tongue projects is formed with rounded shoulders 9. The tongue 8 is of a width to fit into and move along the slot 5 and the tip of the tongue may enter the slot.

There is also provided another clamp member 10 in the form of a strip of flat metal curved into conformity with the general curvature of the clamp. The member 10 has an angle end 11 with a perforation 12 and side webs 13 similar to the end 2 of the member 1. The member 10 has an elongated longitudinally disposed slot 14 near the end 11 and another shorter slot 15 in line with the slot 14 and on the side thereof remote from the end 11. These is also provided a bolt 16 having at one end a head 17 and at the other provided with a nut 18.

When the parts are in position to clamp a hose, the member 10 is applied to that portion of the member 1 having the tongues or hooks 6 with two of the tongues extending through the slots 14 and 15 and the shoulders 7 of the tongues engaging corresponding end walls of the slots 14 and 15. The slot 14 is sufficiently long to accommodate two of the tongues 6, in which case the slot 15 is traversed by that tongue 6 next to the slot 5 and in such event the ends 2 and 11 are in the more distant relation. Instead of two of the tongues extending through the slot 14, those two tongues more distant from the end 2 may enter the respective slots 14 and 15 in which case the tongue 6 nearest to the slot 5 is inert or inactive. Under these circumstances the ends 2 and 11 are in the position of nearest approach, so long as not drawn more closely together by the bolt 16. In either event the tongue 8 is in position to enter the slot 5, and this slot is of sufficient length to permit the drawing together of the ends 2 and 11 by the bolt 16 until the band or clamp member 1 has been coiled more closely together than its position of greatest expansion.

When the clamp is expanded to its largest size the member 10 may engage those two hooks 6 more distant from the slot 5 and the coiling of the member 1 under the drawing action of the bolt 16 will cause the clamp to tightly grip a hose of large diameter. For smaller hose the member 10 is moved along the member 1 toward the slot 5 until those two hooks 6 the closer to the slot 5 are engaged through the slots 14 and 15, and then on drawing up the bolt 16 the clamp member 1 is caused to collapse with the tongue 8 moving along the slot 5 until the smaller size of hose is firmly clamped.

The bend or shoulder 7 in each hook 6 gives practically a straight draw against the end of the cut material where punched out to form the slots 14 and 15. This produces an exceptionally strong catch or hook, and, therefore, permits the employment of relatively light material without the liability of drawing out the hooks which might occur in the absence of the bends or shoulders 7.

Where the band or strip 1 extends between the ends 2 and 11 it is of full width and has no tendency to buckle, while the tongue 8 guides this end in the drawing up operation of the clamp and prevents the free end of the body member 1 from side movements, while at the same time the tongue 8 in entering the slot 5 is out of the way of the material of the hose, and consequently will not dig into it.

By loosening the bolt the clamp is easily expanded sufficiently to permit throwing off the member 10 from engagement with the hooks or catches 6, so that the clamp can be applied to or removed from the hose without the necessity of completely taking out the bolt, so that the liability of losing any of the parts is avoided.

What is claimed is:—

1. A hose clamp comprising a strip of metal coiled into a volute with one end overlapping the other, said strip having an elongated slot adjacent to one end and the other end formed into a tongue adapted to enter the slot, and said strip between the slot and the end provided with a tongue being formed with a series of outstanding hooks or catches struck up from the body of the strip, and a companion member provided with adjacent slots spaced to be traversed by the hooks or catches and one of said slots being longer than the other, the two members having matching ends outturned from the body of the clamp to receive a clamping bolt.

2. A hose clamp comprising an elongated strip of metal bent upon itself into a volute with one end overlapping the other, and another strip of metal of less length than the first strip, both strips having one of the ends bent at an angle to the curvature of the clamp and perforated for the passage of a drawing bolt, one strip having an elongated slot formed in it adjacent the angle end and a series of integral hooks struck up from the material of the strip and each having its free end at an angle to the remainder of the hook to provide a shoulder, and said series of hooks being elongated in the direction of the length of the strip, said strip terminating at the end remote from the angle end in a tongue prolongation and rounded shoulders at the base of the tongue, and said second strip of metal having an angle end and slots near the other end, said slots being arranged in order in the direction of the length of the strip and the slot toward the angle end being elongated in the direction of the length of the strip, the slots in the second strip being adapted to engage the hooks in the first strip and the number of hooks in the first strip being greater than the number of slots in the second strip, and a draw bolt adapted to the angle ends of the strips to compress the clamp about the hose.

3. A hose clamp comprising a strip of metal coiled into a volute with one end overlapping the other and provided with an elongated slot adjacent to one end and at the other end formed into a tongue adapted to enter and move along the slot, said strip between the slot and end provided with a tongue being formed into a series of outstanding hooks or catches, and a companion member provided with adjacent slots spaced to be traversed by the hooks or catches, the two members having matching ends outturned from the body of the clamp to receive a clamping bolt.

4. A hose clamp comprising two curved strips coactively formed to grip together and provided with means for reducing the effective size of the clamp, one clamp member including more than a complete turn with one end formed into a longitudinally projecting tongue and a corresponding portion of the member being formed with a longitudinal slot of a size to receive the tongue and permit movements of the two portions of the member on each other.

In testimony that I claim the foregoing as my own, I have hereto affixed my signature in the presence of two witnesses.

FREDERICK CHARLES SCOTT.

Witnesses:
N. COOK,
E. BLEAKLEY.